United States Patent [19]

Bliss

[11] 3,954,650

[45] May 4, 1976

[54] AMINE HARDNER COMPOSITIONS

[75] Inventor: Joseph Francis Bliss, Somerville, N.J.

[73] Assignee: Union Carbide Corporation, New York, N.Y.

[22] Filed: Oct. 31, 1973

[21] Appl. No.: 411,374

Related U.S. Application Data

[60] Division of Ser. No. 197,102, Nov. 9, 1971, Pat. No. 3,790,522, which is a continuation-in-part of Ser. No. 822,306, May 6, 1969, abandoned.

[52] U.S. Cl. ............................ 252/182; 106/308 N; 260/2 N; 260/18 R; 260/33.4 EP; 260/37 EP; 260/47 EN

[51] Int. Cl.$^2$ ........................................ C08G 59/56

[58] Field of Search ............... 252/182; 260/47 EN, 260/37 EP, 33.4 EP, 18, 2 N; 106/308 N

[56] References Cited

UNITED STATES PATENTS

| | | | |
|---|---|---|---|
| 2,676,987 | 4/1954 | Lewis et al. | 260/501.15 |
| 2,928,809 | 3/1960 | Hicks | 260/47 EN |
| 3,374,193 | 3/1968 | Tsatos | 260/18 EP |
| 3,389,160 | 6/1968 | Reid | 260/448.2 N |
| 3,654,261 | 4/1972 | Johnson | 260/37 EP |

OTHER PUBLICATIONS

Payns; Organic Coating Technology, Vol. II, John Wiley, 1961, pp. 730 & 731.

*Primary Examiner*—Leland A. Sebastian
*Assistant Examiner*—Irwin Gluck
*Attorney, Agent, or Firm*—Reynold J. Finnegan

[57] ABSTRACT

Compositions comprising a polyepoxide or an amine hardner and less than 0.1 per cent by weight of a quaternary ammonium compound based on the weight of the polyepoxide or amine hardner employed which compositions resist filler hard-settle upon storage and are suitable precursor compositions for cured epoxide products.

7 Claims, No Drawings

AMINE HARDNER COMPOSITIONS

This application is a divisional application of U.S. application, Ser. No. 197,102, filed Nov. 9, 1971, now U.S. Pat. No. 3,790,522 which in turn is a continuation-in-part of U.S. application, Ser. No. 822,306, filed May 6, 1969, now abandoned.

BACKGROUND OF THE INVENTION

This invention is directed to novel polyepoxide — and amine hardner-quaternary ammonium compound containing compositions. More particularly this invention is directed to novel precursor compositions for cured polyepoxide products, which compositions resist filler hard-settle.

It is well known that such precursor compositions containing an inorganic filler suffer from the disadvantage of having the filler hard-settle out of the compositions upon standing or storage. For example, upon storage of an epoxy resin-silica filler composition, the silicon dioxide filler settles out, i.e. falls to the bottom of the container for the composition and turns into a hard packed mass which is extremely difficult, if not impossible, to redisperse through the composition prior to use. Consequently the shelf-life or storage time of such types of precursor filler containing compositions is extremely short, normally only a few days. Not being able to store such precursor compositions for longer periods of time requires, in most instances, that the filler of an epoxy resin system must be added and mixed just prior to curing of the resin. The disadvantages and high expense encountered by such procedures and separate shipment and storage problems are obvious.

SUMMARY OF THE INVENTION

It has now been discovered that the above disadvantages and problems may be overcome by the instant invention and that polyepoxide — and amine hardner — filler compositions which also contain a small amount of a quaternary ammonium compound can be prepared and stored for long periods of time without hard-settling of the filler.

Therefore, it is an object of this invention to provide novel compositions comprising a polyepoxide, a filler and a small amount of a quaternary ammonium compound which compositions resist upon storage the hard-settling of the filler. It is also an object of this invention to provide novel compositions comprising a polyepoxide and a small amount of a quaternary ammonium compound to which the filler may be added. It is another object of this invention to provide novel polyepoxide free compositions comprising an amine hardner, filler and a small amount of a quaternary ammonium compound, which compositions resist upon storage hard-settling of the filler. It is a further object of this invention to provide novel polyepoxide free compositions comprising an amine hardner and a small amount of a quaternary ammonium compound to which the filler may be added. Other objects and advantages of this invention will become readily apparent from the following description and appended claims.

DESCRIPTION OF THE PREFERRED EMBODIMENTS

More specifically, the instant invention may be represented as a precursor composition for cured polyepoxide products, to which a filler can be incorporated, said compositions being resistent to filler hard-settle upon storage and consisting essentially of a curable polyepoxide or an amine hardner and from 0.02 to less than 0.1 per cent by weight of a quaternary ammonium compound based on the weight of the polyepoxide or amine hardner employed.

Any curable polyepoxide or mixture of two or more curable polyepoxides can be used in the present invention. Curable polyepoxides as well as their methods of manufacture are well known in the art as witnessed for example by U.S. Pat. Nos. 2,506,486; 2,633,458; 2,801,989; 2,870,170; 2,885,385; 2,898,389; 2,951,822; 2,951,825; 3,201,306 and British Pat. No. 980,776 as well as many other patents too numerous to mention, the disclosures of said references being incorporated herein by reference thereto. The polyepoxides used in this invention comprises those compounds having more than one epoxy group i.e.,

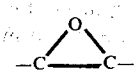

group per molecule, which can be in the terminal and/or inner positions of the epoxy compound. The polyepoxides can be saturated or unsaturated, aliphatic, cycloaliphatic, or heterocyclic, as well as, be monomeric or polymeric and can be substituted, if desired, with any conventional polyepoxide substituent, such as halogen atoms, hydroxyl groups, ether radicals and the like. Illustrative of such polyepoxides are the polyglycidylethers, polyglycidylesters, polyglycidylcompounds of amines, epoxidized cyclics and the like.

Among the preferred polyepoxides are the polyglycidyl-ethers of the polyhydric phenols, exemplified by the polyglycidyl-ethers of such phenols as the mononuclear polyhydric phenols, e.g., resorcinol, catechol, hydroquinone and pyrogallol, the di or polynuclear phenols, such as naphthols and the bisphenols described in U.S. Pat. No. 2,506,486 and polyphenylols such as the novolak condensation product of a phenol and a saturated or unsaturated aldehyde containing an average from 3 to 20 or more phenylol groups per molecule (cf. "Phenoplasts" by T. S. Carswell, published in 1947 by Interscience Publishers, New York). Exemplary of polyphenylols derived from a phenol and an unsaturated aldehyde such as acrolein as the triphenylols, pentaphenylols, and heptaphenylols described in U.S. Pat. No. 2,885,385. The phenols may contain substituents such as alkyl or aryl ring substituents or halogens, as exemplified by the alkyl resorcinols, tribromoresorcinol, and the diphenols containing alkyl and halogen substituents on the aromatic ring in U.S. Pat. No. 2,506,486. The polyhydric polynuclear phenols can consist or two or more phenols connected by such groups as methylene, alkylene or sulfone. The connecting groups are further exemplified by bis-(4-hydroxyphenyl)-methane, bis(4-hydroxyphenyl)dimethylmethane, dihydroxydiphenyl sulfone and the like.

The preparation of polyglycidyl ethers of polyhydric phenols is described in detail in U.S. Pat. No. 2,506,486 and U.S. Pat. No. 2,801,989. The general process is to react a polyhydric phenol with a halogen containing epoxide or dihalohydrin, especially epichlorohydrin. Among the more preferred polyglycidyl ethers of polyhydric phenols are the polyglycidylether of 2,2-bis(parahydroxyphenyl)propane; the polyglycidylether of bis(parahydroxyphenyl)methane. Other polyglycidyl ethers of polyhydric phenols are enumerated in U.S. Pat. No. 2,633,458.

Also suitable are the polyglycidyl ethers of polyhydric aliphatic alcohols or polyfunctional amines or amino substituted aliphatic alcohols. Examples of such alcohols are aliphatic compounds containing from two or four alcoholic hydroxyl groups, such as ethylene glycol, propane diols, butane diols, glycerine, hexane diols and the like. Methods for preparing polyglycidyl ethers of polyhydric alcohols are described in U.S. Pat. No. 2,898,389. Examples of polyamines and aminosubstituted aliphatic alcohols include ethylenediamine, propylenediamine, butylenediamine, pentylenediamine, hexylenediamine, octylenediamine, nonylenediamine, decylenediamine and the like, diethylene-triamine, triethylenetetramine, tetraethylpentamine, dipropylene-diamine and the like, and 2-aminoethanol, 2-aminopropanol, 3-aminobutanol, 1,3-diamino-2-propanol and the like. Further illustrations of such amine compounds and methods for preparing the polyglycidyl ethers thereof can be found described in U.S. Pat. No. 3,201,306.

Other suitable polyepoxides are the polyglycidyl esters of polycarboxylic acids which may be obtained by reacting a polycarboxylic acid with a halohydrin, such as epichlorohydrin or dichlorohydrin, as described in U.S. Pat. No. 2,870,170 and British Pat. No. 980,776. Such polyesters may be derived from aliphatic polycarboxylic acids, such as oxalic acid, succinic acid, glutaric acid, adipic acid, pimelic acid, suberic acid, azelaic acid, sebacic acid and the like, or from aromatic polycarboxylic acids, such as phthalic acid, isophthalic acid, terephthalic acid, 2,6-naphthalenedicarboxylic acid, diphenylortho, ortho'-dicarboxylic acid, ethylene glycol bis-(paracarboxyphenyl)ether, and the like.

Also suitable are polyglycidyl compounds produced by reacting epichlorohydrin with aromatic amines such as aniline, 2,6-dimethyl aniline, p-toluidine, m-chloroaniline, p-aminodi-phenyl, m-phenylene diamine, p-phenylene diamine, 4,4'-diamino-diphenyl methane or with amino phenols such as p-amino phenol, 5-amino-1-naphthol, 4-amino resorcinol, 2-methyl-4-amino phenol, 2-chloro-4-aminophenol and the like. Specific compounds include, among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the amino-hydrogen and OH hydrogen atoms are replaced by glycidyl groups. Polyglycidyl derivatives of aromatic amines and amino phenols and methods for their preparation are further described in U.S. Pat. Nos. 2,951,822 and 2,951,825.

Other suitable polyepoxides are epoxidized cyclic compounds such as 1,2,5,6-diepoxydimethyl cyclooctane, 3,4-epoxy-6-methylcyclohexylmethyl-3,4-epoxy-6-methylcyclohexane carboxylate, bis-(3,4-epoxycyclohexanecarboxylate), bis(2,3-epoxycyclopentyl)-ether, vinylcyclohexane dioxide, dicyclopentadiene dioxide, di-ethylene glycol bis(3,4-epoxy-6-methylcyclohexane carboxylate), 3,4-epoxycyclohexylmethyl 3,4-epoxycyclohexane carboxylate, 3,4-epoxy-1-methylcyclohexylmethyl-3,4-epoxy-1-methylcyclohexanecarboxylate, 1,6-hexanediol bis(3,4-epoxycyclohexanecarboxylate), bis(3,4-epoxycyclohexylmethyl)oxalate, 3,4-epoxy-6-methylcyclohexylmethyl-9,10-epoxypentyl-4,5-epoxy pentanoate, bis(3,4-epoxy-6-methylcyclohexylmethyl)sebacate, diglycidyl acetal, divinyl benzene dioxide, dipentene dioxide, 1,2,5,6-diepoxy cyclo-octane, bis(3,4-epoxy-6-methylcyclohexylmethyl)adipate, glycidyl 2,3-epoxy cyclopentyl ether, 3,9-bis(1,2-epoxy-1-methylethyl)-spirobi(meta dioxane), bis(3,4-epoxycyclohexyl)sulfone, glycidyl 2,3-epoxybutyl ether, bis(2,3-epoxy-2-methylpropyl)ether, 1,1-bis(2,3-epoxy-2-methylpropoxy)ethane, di(6-methyl-3,4-epoxycyclohexylmethyl)ether, (6-methyl 3,4-epoxycyclohexylmethyl) (3,4-epoxycyclohexylmethyl)ether, 2,3-epoxycyclopentyl phenyl glycidyl ether and the like, particularly those which are free of amino, amido, carboxyl and anhydride groups.

As epoxy compounds containing an inner 1,2-epoxide group there are suitable diolefins, dienes or cyclic dienes, such as 1,2:5,6-diepoxyhexane, 1,2:4,5-diepoxycyclohexane, di-cyclopentadiene diepoxide, dipentene diepoxide, and vinylcyclo-hexene diepoxide, as well as, epoxidized diolefinically unsaturated carboxylic acid esters, such as methyl-9,10:12,13-diepoxy stearate, the dimethyl ester of 6,7:10,11-diepoxyhexadecane-1,16-dicarboxylic acid, and the like. Furthermore there may be mentioned epoxidized monoethers, diethers and polyethers, monoesters, diesters and polyesters, and monoacetals, diacetals and polyacetals containing at least one cycloaliphatic 5-membered or 6-membered ring to which at least one 1,2-epoxide group is attached. Further suitable compounds containing an inner 1,2-epoxide group are epoxidized diolefine polymers, such as polymers of butadiene or cyclopentadiene and epoxidized fatty acids, fatty oils and fatty esters. Preferred butadiene polymers are epoxidized copolymers with styrene, acrylonitrile, and adducts with toluene or xylene.

The upper amount of polyepoxide in the system is immaterial. Generally it is preferred to employ polyepoxides which are already liquids at room temperature. However if the polyepoxide is a solid at room temperature it may easily be converted into liquid form by dissolving it in any conventional polyepoxide solvent or mixtures thereof. Such liquid organic solvents are well known in the art. Typical solvents include aromatic hydrocarbons, e.g. xylene and the like; organic ethers, such as dimethyl ether, diethyl ether, dibutyl ether, methylpropyl ether, ethylene glycol, butyl glycidyl ether, cresyl glycidyl ether, phenyl glycidyl ether and the like; organic esters, such as methyl acetate, butyl acetate, ethyl propionate, isophrone ethyl acetate and the like and organic ketones, such as acetone, cyclohexanone, methyl ethyl ketone and the like. Any amount of solvent may be employed that is sufficient to solubilize the polyepoxide compound. While it is preferred to employ liquid polyepoxides, sometimes it may be desireable to dilute the liquid polyepoxide to reduce its viscosity. While any conventional diluent may be used the preferred diluents for this purpose are the glycidyl ethers or mixtures thereof, especially butyl glycidyl ether, cresyl glycidyl ether and phenyl glycidyl ether. Naturally the amount of said dilute employed merely depends on the particular viscosity for the polyepoxide desired.

Any cationic quaternary ammonium compound or mixture of two or more such compounds can be employed in the present invention. These cationic compounds can be entirely organic or they can be of the organosilicon type. Said compounds as well as methods for their preparation are well known.

The cationic organic quaternary ammonium compounds can be generally characterized structurally by the formula:

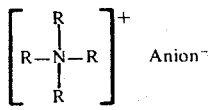

wherein each R is individually selected from the group consisting of hydrogen and a monovalent organic radical containing from 1 to 24 carbon atoms and wherein the anion associated with the quaternary ammonium cation is any acidic group such as a halogen anion, a carboxylic acid anion, a nitrate anion, a sulfate or sulfonate anion, a hydroxy anion, and the like, while preferably the anion is a hydroxyl or chlorine anion.

The monovalent organic radical, represented by R, can contain only carbon and hydrogen atoms (i.e. be a hydrocarbon radical) or optionally contain other atoms, such as oxygen, moreover two or three R radicals taken together with the nitrogen atom of the above formula can form a heterocyclic radical. Preferably the radical, R, is a hydrocarbon group, such as an alkyl, cycloalkyl, aryl or alkaryl group or a monovalent hydroxyalkyl group such as beta-hydroxyethyl, beta-hydroxypropyl and the like. Typical examples of the monovalent hydrocarbon radicals mentioned above are methyl, ethyl, propyl, isopropyl, butyl, isobutyl, tertbutyl, pentyl, hexyl, octyl, 2-ethylhexyl, decyl, 2-ethylcyclohexyl, phenyl, benzyl, ethylbenzyl, dimethylbenzyl, mesityl, cumyl, naphthyl, lauryl, myristyl, stearyl, tetracosyl and the like.

Examples of cationic quaternary ammonium compounds that can be mentioned are ammonium chloride, tetramethyl ammonium chloride, dioctyldimethyl ammonium chloride, benzyltrimethyl ammonium chloride, distearyldimethyl ammonium chloride, octyl-stearyl-dimethyl ammonium chloride, dicetyldimethyl ammonium chloride, cetyl-stearyl-dimethyl ammonium bromide, dilauryldimethyl ammonium chloride, p-ethylbenzyl-layryl-dimethyl ammonium nitrate, p-ethylbenzyl-stearyl-dimethyl ammonium sulfate, 3,5-dimethylbenzyl-lauryl-dimethyl benzenesulfonate, 3,5-dimethylbenzyl-stearyl-dimethyl ammonium chloride, benzyl-lauryl-dimethyl ammonium chloride, benzyl-stearyl-dimethyl ammonium bromide, lauryltrimethyl ammonium chloride, stearyltri-methyl ammonium chloride, 2-methylquinoline-N-cetyl ammonium chloride, 2-methylquinoline-N-tetradecyl ammonium chloride, cetyltrimethyl ammonium chloride, tetracosyltrimethyl ammonium chloride, benzyltrimethyl ammonium chloride, benzyltrimethyl ammonium acetate, benzyltriethyl ammonium formate, benzyltripropyl ammonium stearate, benzyltributyl ammonium acetate, ethylenebistrimethyl ammonium chloride, octyltrimethyl ammonium chloride, β-hydroxyethyl-trimethyl ammonium hydroxide, benzyltrimethyl ammonium hydroxide, tetramethyl ammonium hydroxide, and the like. The most preferred cationic quaternary ammonium compounds are dilauryldimethyl ammonium chloride and the choline base, β-hydroxyethyl-trimethyl ammonium hydroxide.

The cationic organosilicon compounds useful herein can be generally characterized as any polysiloxane polymer containing a quaternized nitrogen group attached to a silicon atom through a divalent organic bridging group. Examples of such cationic organosilicon compounds are those polysiloxanes containing at least one siloxy units represented by the formula $$[R'_bSiO_{4-b/2}]$$

and at least one siloxy unit represented by the formula

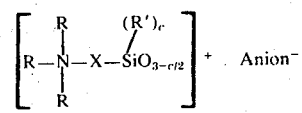

wherein the anion and each R is the same as defined above; each R' is a monovalent hydrocarbon radical having from 1 to 20 carbon atoms such as those mentioned above but most preferably a lower alkyl or phenyl radical; b is an integer having a value of from 1 to 3, c has a value of 0 to 2 and X represents a divalent organic bridging group, such as a divalent alkylene radical, a divalent hydroxy substituted alkylene radical, or a divalent hydroxy substituted alkylene-carbonoxy radical wherein the oxygen in said alkylenecarbonoxy radical is present in the form of ether linkages.

Among the more preferred cationic organosilicon compounds are those having the formula

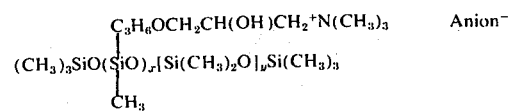

wherein $x$ has an average value of from 1 to about 50 and $y$ has an average value of from 0 to about 250 and wherein the ratio of $y$ to $x$ is no greater than about 20 to 1 and wherein the Anion is the same as defined above, especially chlorine. Such organosilicon polymers may be found more fully described in U.S. Pat. No. 3,389,160. The most preferred cationic organosilicon compounds are those of the formula

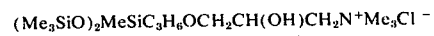

and

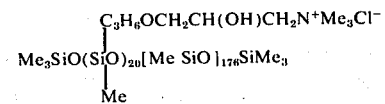

wherein each Me represents a methyl radical, (—CH$_3$).

As between the cationic silicon-free organic quaternary ammonium compounds and the cationic organosilicon compounds it is preferred to employ the silicon-free organic quaternary ammonium compounds since they are less expensive. Moreover, the use of quaternary organosilicon compounds have a tendency to make the composition hazy an effect that has not been observed with the silicon-free organic quaternary ammonium compounds.

Still another unique feature of the instant invention relates to the discovery of employing the above-defined quaternary ammonium compounds to prevent the inorganic filler from hard-settling out of a polyfunctional amine hardner system which is free from the polyepoxide. Such a alternative system enables the user to first form a polyepoxide free composition comprising a quaternary ammonium compound as defined above; a filler; and a polyfunctional amine hardner and store or ship same over extended periods of time without fear of the filler hard-settling out. Of course if desired various combination mixtures of any one type of ingredient could be employed if desired.

By the term "polyfunctional amine hardner" as used herein, is meant an amine having at least two active amino hydrogen atoms which can be on the same or different nitrogen atoms. Among the polyfunctional amines contemplated are the aliphatic amines, aromatic amines, aralkyl amines, cycloaliphatic amines, alkaryl amines, aliphatic polyamines including polyalkylene polyamines, amino-substituted aliphatic alcohols and phenols, polyamides, and the like. Such types of hardners are well known and can be found further described in U.S. Pat. No. 3,201,360. The amine hardner compounds can have a molecular weight range of from about 45 to 10,000. Preferably said amine hardners contain from 2 to 50 carbon atoms and are selected from the group consisting of aliphatic amines, aromatic amines and alkylene polyamines.

Typical aliphatic amines include methylamine, ethylamine, propylamine, isopropylamine, butylamine, isobutylamine, 2-ethyl-hexylamine, 3-propylheptylamine, and the like. Examples of aromatic amines, aralkyl amines and alkaryl amines include, among others, aniline, o-hydroxyaniline, m-toluidine, 2,3-xylidine, benzylamine, phenethylamine, 1-naphthylamine, meta-, ortho-, and paraphenylenediamines, 1,4-naphthalenediamine, 3,4-toluenediamine, and the like. Illustrative cycloaliphatic amimes include cyclopentylamine, cyclohexylamine, β-methane-1,8-diamine, and the like.

Among the polyamides are those having an average molecular weight range from about 300 to about 10,000, which include condensation products of polycarboxylic acids, in particular, hydrocarbon dicarboxylic acids, such as malonic acid, succinic acid, glutaric acid, adipic acid, dilinalenic acid, and the like, with polyamines, particularly diamines, such as ethylenediamine, propylenediamine, and the like.

Aliphatic polyamines include ethylenediamine, propylene-diamine, butylenediamine, pentylenediamine, hexylenediamine, octylenediamine, nonylenediamine, decylenediamine, and the like. Poly-alkylene polyamines, such as diethylenetriamine, triethylenetetraamine, tetraethylenepentamine, dipropylenetriamine, and the like, are particularly preferred. The amino-substituted aliphatic alcohols and phenols are illustrated by 2-aminoethanol, 2-amino-propanol, 3-aminobutanol, 1,3-diamino-2-propanol, 2-aminophenol, 4-aminophenol, 2,3-diaminoxylenol, and the like.

Examples of still other polyfunctional amines include, among others, heterocyclic nitrogen compounds, such as piperazine, 2,5-dimethylpiperazine, and the like; aminoalkyl-substituted hetero-cyclic compounds, such as N-(aminopropyl)morpholine, N-(aminoethyl) morpholine, and the like; amino-substituted heterocyclic nitrogen compounds such as melamine, 2,4-diamino-6-(aminoethyl)pyrimidine, and the like, dimethylurea, quanidine, p,p'-sulfonyldianiline, 3,9-bis(aminoethyl)spirobimetadioxane, hexahydrobenzamide, and the like.

The conditions, ingredients and ratios of these polyepoxide free-amine hardner compositions are the same as for the polyepoxide containing compositions. The only difference being that the amine hardner ingredient has taken the place of the polyepoxide ingredient. For example, the upper amount of amine hardner in the system is immaterial and the quaternary ammonium compounds can be any of those defined above or mixtures thereof while the filter can be any of those defined below or mixtures thereof. The preferred quaternary ammonium compounds being of the cationic organic type, especially dilauryldimethyl ammonium chloride and β-hydroxyethyl-trimethyl ammonium hydroxide; the preferred filler being silicon dioxide.

The filler employed in both types of compositions of this invention may be any conventional inorganic filler or extender commonly employed in the polyepoxide art. Such fillers may be employed alone or in various combinations and include for example, asbestos, asphalt, bitumen, glass fibers, magnesium carbonate, various clays, such as kaolin and the like, chalk, slate, various metal powders such as titanium dioxide, aluminum powder and the like, talc, mica, blanc fixe, carbon black, diatomaceous earth, fumed silica, precipitated silica, silica aerogel, and silicon dioxide ($SiO_2$) i.e., silica, sand, quartz, etc. The most preferred filler is silicon dioxide.

The amount of quaternary ammonium compound present in both the polyepoxide containing and polyepoxide free compositions of this invention is less than 0.1 per cent by weight of the ammonium compound based on the weight of the polyepoxide or amine hardner employed, the preferred range being about 0.02 to about 0.09 per cent by weight of ammonium compound. The most preferred amount of ammonium compound present being about 0.075 per cent by weight based on the polyepoxide or hardner.

The quaternary ammonium compounds have surprisingly been found to prevent filler hard settle from said precursor compositions upon storage for extended periods of time. Of course it is to be understood that filler soft-settle, i.e. that which settles out but is easily remixed or redispersed is to be distinguished from filler hard-settle, i.e. that which settles into a hard packed mass which is very difficult if not impossible to remix or redisperse.

It is recommended that the instant precursor compositions be stored at room temperature (about 25°C.) although the preferred beta-hydroxyethyl trimethylammonium hydroxide has been found not to adversely affect the polyepoxide even at storage temperatures up to about 40°C. Naturally high storage temperatures which might adversely affect the precursor compositions, e.g. cause an undesireable substantial increase in the viscosity of the polyepoxide or even initiate a cure of the compositions, should be avoided. The amount of quaternary ammonium compound employed in this invention has been found to be insufficient to cause the compositions to cure or cause any undesirable substantial increase in viscosity of curable polyepoxides upon storage at room temperature for long periods of time. Thus like high storage temperatures, higher amounts of quaternary ammonium compounds should be avoided since they may lead to such problems and are, in any event, not necessary to the instant invention.

Generally it is preferred to employ the quaternary ammonium compound in the form of a solvent solution since this is how most conventional quaternary ammonium compounds are made available, although such is not necessary if the ammonium compound is already in liquid form. Any conventional solvent or mixtures thereof for the quaternary ammonium compounds may be employed for example, water, alcohols, mineral spirits and the like. Generally it is preferred to use water or an alcohol, preferably an aliphatic alcohol of from 1 to 12 carbon atoms, especially methanol, ethanol, propanol and isopropanol, for the quaternary ammonium compounds.

The amount of solvent employed need only be that sufficient to solubilize the ammonium compound. Generally for most purposes it has been sufficient to employ equal amounts of solvent and quaternary ammonium compound, although lower or higher amounts can be used, if desired.

The amount of inorganic filler in both systems is immaterial in that it depends essentially on the nature of what the ultimate cured polyepoxide is to be used for. It has been found that amounts of filler up to and equal to the amount of polyepoxide or amine hardner have been successfully prevented from hard-settling out. In general, the amount of filler employed can range from about 1 to 500 per cent by weight based on the weight of the total composition.

The manner and order in which the various ingredients of the compositions of this invention are mixed are immaterial, the ultimate desired result being a liquid type composition which resists hard-settling of the inorganic filler upon storage.

Of course it should also be understood that the instant compositions can possess additional conventional ingredients for cured polyepoxide products, so long as they and/or their amounts would not destroy the basic concept of the instant invention, namely that both compositions of this invention are unique in that they provide for suitable precursor systems for conventional cured polyepoxide compounds and products which systems may be premixed along with an inorganic filler and stored for long periods of time prior to curing without the disadvantage of having the filler hard-settling out thereby rendering it virtually impracticable and/or impossible to redisperse same. For example, the polyepoxide containing compositions can contain hardners such as polyfunctional amines, polycarboxylic acids, polycarboxylic acid anhydrides, polyols, polythiols, polyisocyanates, polythioisocycanates, polyacyl halides and the like, while both systems could possess coloring materials like pigments or dyestuffs, as well as plasticizers, flame-inhibiting substances, mould releasing agents, and the like as well as the above mentioned fillers, diluents and solvents.

The cured polyepoxide compounds are conventional products that find a wide range of utility such as adhesives, potting and encapsulating agents, moulding compounds, laminating agents, caulking compounds, tooling compounds, protective coatings for floors, tanks, etc., and the like and may be obtained by formulating the desired precursor system from the instant compositions and curing same by any conventional curing process well known in the art. Preferably the polyepoxide compositions of this invention can be cured using any conventional curing agent, especially the amine hardners, although they may also be cured in conjunction with conventional catalysts or by heat alone. Of course, it is understood that one will have to add a polyepoxide to the amine hardner compositions of this invention before curing. The particular curing procedure is not critical and is merely left to the judicious choice of the operator as are the particular final formulated precursor systems since such will obviously be governed by the end result desired by said operator.

The following examples are illustrative of the present invention and are not to be regarded as limitative. It is to be understood that all parts, percentages and proportions referred to herein and in the appended claims are by weight unless otherwise indicated.

The method of testing the hard-settling out of the inorganic filler from the composition was as follows.

A pigment settling gage was employed. This gage consists of a plunger assembly comprising a plunger rod, calibrated at the upper half, having a perforated disc attached to the bottom and a small disc attached to the top upon which ingredient load weights can be placed. The whole assembly is centered on a tripod. This gage allows for a simple means for systematic probing of the layering of filler which settles to the bottom of a can containing the composition to be evaluated during a given time period. The gage is set over the can so that it straddles the can with its tripod legs. The perforated disc acts as the probe and is pushed down through the composition under a step-wise increase in loading of the weights at scheduled time intervals. The loading process is continued until the perforated disc touches and comes to rest on the bottom of the can or until the maximum loading is reached with a layer of filler still present which resists displacement and the readings from the graduated scale recorded. This gage may be found more fully described in the article "A Simple Pigment-Settling Gage And A Simple Anti-Sag Test" by Patton published in the January, 1957, issue of the "Official Digest" of the Federation of Paint and Varnish Production Clubs. The test is carried out at room temperature.

EXAMPLE 1

A composition comprising a mixture of 500 grams of a curable polyepoxide, the diglycidyl ether of 2,2-bis(-parahydroxyphenyl)propane having an epoxy equivalent weight of about 190 and a viscosity of about 12,000 centipoises at 25°C., and 500 grams of silicon dioxide (p-quartz) filler was prepared and deairated.

EXAMPLE 2

A composition comprising a mixture of 500 grams of a curable polyepoxide, the diglycidyl ether of 2,2-bis(-parahydroxyphenyl)propane having an epoxy equivalent of about 190 and a viscosity of about 12,000 centipoises at 25°C. 0.75 grams of a cationic organic quaternary ammonium compound, Aliquat 204, a dimethyldilauryl ammonium chloride, and 500 grams of silicon dioxide (p-quartz)filler was prepared and deairated.

EXAMPLE 3

A composition comprising a mixture of 500 grams of a curable polyepoxide, the diglycidyl ether of 2,2-bis(-para-hydroxyphenyl)propane having an epoxy equivalent of about 190 and a viscosity of about 12,000 centipoises at 25°C., 0.75 grams of a cationic organic quaternary ammonium compound, chloine base, a fifty per cent solution of beta-hydroxyethyltrimethyl ammonium hydroxide in methanol, and 500 grams of silicon dioxide (p-quartz)filler was prepared and deairated.

EXAMPLE 4

The compositions of Examples 1 through 3 were stored at room temperature and periodically measured for filler hard-settling by the method outlined herein and the results in inches are reported in the following table:

TABLE I

| No. | Aging Time 30 Days |
|---|---|
| Example 1 | 1.25 |
| Example 2 | 0.01 |
| Example 3 | 0.05 |

The above results demonstrate the effectiveness that less than 0.1 per cent by weight of the cationic quaternary ammonium compounds have on preventing hard-settling of the filler from the compositions.

EXAMPLE 5

Similar results are produced by following the procedure outlined in Example 3 above and replacing the polyepoxide with other polyepoxides such as, the diglycidyl ether of bis-(parahydroxyphenyl)methane, the diglycidyl ether of dihydroxyphenyl sulfone, the polyglycidylether of ethylene glycol, the polyglycidylether of ethylene diamine, the polyglycidyl ester of oxalic acid, and the like.

EXAMPLE 6

A composition comprising a mixture of 440 grams of a curable polyepoxide, the diglycidyl ether of 2,2-bis(-parahydroxyphenyl)propane having an epoxy equivalent weight of about 190 and a viscosity of about 12,000 centipoises at 25°C., 60 grams of butyl glycidyl ether having an epoxy equivalent weight of about 130 and a viscosity of about 20 centipoises at 25°C. and 500 grams of silicon dioxide (silica) filler was prepared and deairated.

EXAMPLE 7

A composition comprising a mixture of 440 grams of a curable polyepoxide, the diglycidyl ether of 2,2-bis(-parahydroxyphenyl)propane having an epoxy equivalent weight of about 190 and a viscosity of about 12,000 centipoises at 25°C., 60 grams of butyl glycidyl ether having an epoxy equivalent weight of about 130 and a viscosity of about 20 centipoises at 25°C., 0.75 grams of a fifty per cent solution of a cationic polysiloxane quaternary ammonium compound of the formula

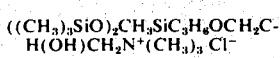

in ethanol, and 500 grams of silicon dioxide (silica) was prepared and deairated.

EXAMPLE 8

A composition comprising a mixture of 440 grams of a curable polyepoxide, the diglycidyl ether of 2,2-bis(-parahydroxyphenyl)propane, having an epoxy equivalent weight of about 190 and a viscosity of about 12,000 centipoises at 25°C., 60 grams of butyl glycidyl ether having an epoxy equivalent weight of about 130 and a viscosity of about 20 centipoises at 25°C., 0.75 grams of a 50 per cent solution of a cationic polysiloxane quaternary ammonium compound of the formula

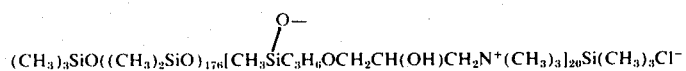

in ethanol, and 500 grams of silicon dioxide (silica) was prepared and deairated.

EXAMPLE 9

A composition comprising a mixture of 440 grams of a curable polyepoxide, the diglycidyl ether of 2,2-bis(-parahydroxyphenyl)propane, having an epoxy equivalent weight of about 190 and a viscosity of about 12,000 centipoises at 25°C., 60 grams of butyl glycidyl ether having an epoxy equivalent weight of about 130 and a viscosity of about 20 centipoises at 25°C., 0.75 grams of a fifty per cent solution of a cationic polysiloxane quaternary ammonium compound of the formula

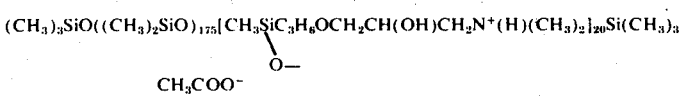

in ethanol, and 500 grams of silicon dioxide (silica) was prepared and deairated.

EXAMPLE 10

A composition comprising a mixture of 440 grams of a curable polyepoxide, the diglycidyl ether of 2,2-bis(-parahydroxyphenyl)propane having an epoxy equivalent weight of about 190 and a viscosity of about 12,000 centipoises at 25°C., 60 grams of butyl glycidyl ether having an epoxy equivalent weight of about 130 and a viscosity of about 20 centipoises at 25°C. and 0.75 grams of a cationic organic quaternary ammonium compound, Arquad C-50, a fifty per cent solution of a trihydrocarbon ammonium chloride salt in isopropanol and 500 grams of silicon dioxide (silica) filler was prepared and deairated.

EXAMPLE 11

A composition comprising a mixture of 440 grams of a curable polyepoxide, the diglycidyl ether of 2,2-bis(-parahydroxyphenyl)propane having an epoxy equivalent weight of about 190 and a viscosity of about 12,000 centipoises at 25°C., 60 grams of butyl glycidyl ether having an epoxy equivalent weight of about 130 and a viscosity of about 20 centipoises at 25°C. and 0.75 grams of a cationic organic quaternary ammonium compound, Aliquat 204, a dimethyldilauryl ammonium chloride, and 500 grams of silicon dioxide (silica) filler was prepared and deairated.

EXAMPLE 12

A composition comprising a mixture of 440 grams of a curable polyepoxide, the diglycidyl ether of 2,2-bis(-parahydroxyphenyl)propane having an epoxy equivalent weight of about 190 and a viscosity of about 12,000 centipoises at 25°C., 60 grams of butyl glycidyl ether having an epoxy equivalent weight of about 130 and a viscosity of about 20 centipoises at 25°C. and 0.75 grams of a cationic organic quaternary ammonium compound, choline base, a fifty per cent solution of beta-hydroxyethyltrimethyl ammonium hydroxide in methanol, and 500 grams of silicon dioxide (silica) filler was prepared and deairated.

EXAMPLE 13

A composition comprising a mixture of 440 grams of a curable polyepoxide, the diglycidyl ether of 2,2-bis(-parahydroxyphenyl)propane having an epoxy equivalent weight of about 190 and a viscosity of about 12,000 centipoises at 25°C., 60 grams of butyl glycidyl ether having an epoxy equivalent weight of about 130 and a viscosity of about 20 centipoises at 25°C. and 0.75 grams of DMP-30, a tridimethyl amino methylphenol, and 500 grams of silicon dioxide (silica) filler was prepared and deairated.

EXAMPLE 14

The compositions of Examples 6 through 13 were stored at room temperature and periodically measured for filler hard-settling by the method outlined herein and the results in inches are reported in following table:

TABLE II

| No. | Aging Time | | | |
|---|---|---|---|---|
| | 27 days | 47 days | 60 days | 134 days |
| Example 6 | — | 1.58 | — | — |
| Example 7 | — | 0.0 | — | — |
| Example 8 | — | — | 0.0 | — |
| Example 9 | 0.04 | — | 0.4 | 0.6 |
| Example 10 | — | — | 0.0 | — |
| Example 11 | 0.01 | — | 0.03 | 0.4 |
| Example 12 | 0.0 | — | 0.02 | — |
| Example 13 | 0.5 | — | 1.4 | — |

The above results demonstrate the effectiveness that less than 0.1 per cent by weight of the cationic quaternary ammonium compounds have on preventing hard-settling of the filler from the compositions. Although Examples 9 and 11 show a minute measure of settle, the ingredients of those compositions were easily remixable by simple stirring while the ingredients of Examples 6 and 13 were not.

EXAMPLE 15

A composition comprising a mixture of about 440 grams of a curable polyepoxide, the diglycidyl ether of 2,2-bis(para-hydroxyphenyl)propane having an epoxy equivalent weight of about 190 and a viscosity of about 12,000 at 25°C., 60 grams of butyl glycidyl ether having an epoxy equivalent of about 130 and a viscosity of about 20 centipoises at 25°C. and 500 grams of silicon dioxide (p-quartz) filler was prepared and deairated.

EXAMPLE 16

A composition comprising a mixture of 440 grams of a curable polyepoxide, the diglycidyl ether of 2,2-bis(-parahydroxy-phenyl)propane having an epoxy equivalent weight of about 190 and a viscosity of about 12,000 at 25°C., 60 grams of butyl glycidyl ether having an epoxy equivalent weight of about 130 and a viscosity of about 20 centipoises at 25°C., 0.75 grams of fifty per cent solution a cationic organic quaternary ammonium compound, chloline base, a beta hydroxyethyltrimethyl ammonium hydroxide in methanol, and 500 grams of silicon dioxide (p-quartz) filler was prepared and deairated.

EXAMPLE 17

A composition comprising a mixture of 440 grams of a curable polyepoxide, the diglycidyl ether of 2,2-bis(-parahydroxyphenyl)propane having an epoxy equivalent weight of about 190 and a viscosity of about 12,000 at 25°C., 60 grams of butyl glycidyl ether having an epoxy equivalent weight of about 130 and a viscosity of about 20 centipoises at 25°C., 0.75 grams of a fifty per cent solution, DMP-30, tridimethyl amino methylphenol, and 500 grams of silicon dioxide (p-quartz) filler was prepared and deairated.

EXAMPLE 18

A composition comprising a mixture of 440 grams of a curable polyepoxide, the diglycidyl ether of 2,2-bis(-parahydroxyphenyl)propane having an epoxy equivalent weight of about 190 and a viscosity of about 12,000 at 25°C., 60 grams of butyl glycidyl ether having an epoxy equivalent weight of about 130 and a viscosity of about 20 centipoises at 25°C., 0.75 grams of a fifty per cent solution of a cationic polysiloxane quaternary ammonium compound of the formula

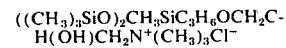

in ethanol, and 500 grams of silicon dioxide (p-quartz) was prepared and deairated.

EXAMPLE 19

A composition comprising a mixture of 440 grams of a curable polyepoxide, a diglycidyl ether of 2,2-bis(-parahydroxyphenyl)propane having an epoxy equivalent weight of about 190 and a viscosity of about 12,000 at 25°C., 60 grams of butyl glycidyl ether having an epoxy equivalent weight of about 130 and a viscosity of about 20 centipoises at 25°C., 0.75 grams of a fifty per cent solution of a cationic polysiloxane quaternary ammonium compound of the formula

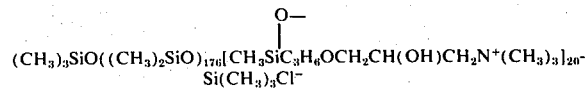

in ethanol, and 500 grams of silicon dioxide (p-quartz) was prepared and deairated.

EXAMPLE 20

A composition comprising a mixture of 440 grams of a curable polyepoxide, the diglycidyl ether of 2,2-bis(-parahydroxyphenyl)propane having an epoxy equivalent weight of about 190 and a viscosity of about 12,000 at 25°C., 60 grams of butyl glycidyl ether having an epoxy equivalent weight of about 130 and a viscosity of about 20 centipoises at 25°C., 0.25 grams of a fifty per cent solution of a cationic polysiloxane quaternary ammonium compound of the formula

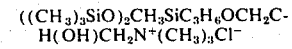

in ethanol, and 500 grams of silicon dioxide (p-quartz) was prepared and deairated.

EXAMPLE 21

The compositions of Examples 15 through 20 were stored at room temperature and periodically measured for filler hard-settling by the method outlined herein and the results in inches are reported in the following table.

TABLE III

| No. | Aging Time | | | |
|---|---|---|---|---|
| | 16 hours | 5 days | 139 days | 188 days |
| Example 15 | 0.25 | 1.0 | — | — |
| Example 16 | 0.0 | 0.0 | 0.1 | — |
| Example 17 | 0.0 | 0.3 | 0.9 | — |
| Example 18 | 0.0 | 0.0 | 0.47 | 0.85 |
| Example 19 | 0.0 | 0.0 | 0.2 | 0.6 |
| Example 20 | 0.0 | 1.25 | — | — |

The above results demonstrate the effectiveness that less than 01 per cent by weight of the cationic quaternary ammonium compounds have on preventing hard-settling of the filler from the compositions even when the amount of quaternary ammonium compound was only about 002 per cent by weight as seen by Example 20 Although Examples 18 and 19 show a minute measure of settle, the ingredients of those compositions were easily remixable by simple stirring while the ingredients of Examples 15 and 17 were not.

EXAMPLE 22

A composition comprising a mixture of 500 grams of a curable polyepoxide, 3,4-epoxycyclohexylmethyl-3,4-epoxycyclo-hexanecarboxylate having an epoxy equivalent weight of about 135 and a viscosity of about 400 centipoises at 25°C. and 500 grams of silicon dioxide (silica) filler was prepared and deairated.

EXAMPLE 23

A composition comprising a mixture of 500 grams of a curable polyepoxide, 3,4-epoxycyclohexylmethyl-3,4-epoxycyclohexanecarboxylate having an epoxy equivalent weight of about 135 and a viscosity of about 400 centipoises at 25°C., 0.75 grams of fifty per cent solution of a cationic polysiloxane quaternary ammonium compound of the formula

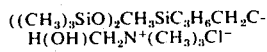

in ethanol, and 500 grams of silicon dioxide (silica) was prepared and deairated.

Similar compositions stabilized against filler hard-settling are produced by replacing the above polyepoxide with other curable polyepoxides such as the polyepoxides of bis(2,3-epoxycyclopentyl)ether, bis(3,4-epoxy-6-methylcyclohexylmethyl, the diglycidyl ether of bis(-parahydroxyphenyl) methane, and the like and/or replacing the above quaternary ammonium compound with other quaternary compounds such as beta-hydroxyethyltrimethyl ammonium hydroxide, dimethyldilauryl ammonium chloride and the like.

EXAMPLE 24

A composition comprising a mixture of 500 grams of a curable polyepoxide, 3,4-epoxycyclohexylmethyl-3,4-epoxy-cyclohexanecarboxylate having an epoxy equivalent weight of about 135 and a viscosity of about 400 centipoises at 25°C., 0.75 grams of a fifty per cent solution of a cationic polysiloxane quaternary ammonium compound of the formula

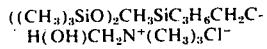

in ethanol, and 500 grams of silicon dioxide (p-quartz) was prepared and deairated.

EXAMPLE 25

The compositions of Examples 22 through 24 were stored at room temperature and periodically measured for filler hard-settling by the method outlined herein and the results in inches are reported in the following table.

TABLE IV

| No. | 14 days | 39 days | 60 days | 190 days |
|---|---|---|---|---|
| Example 22 | 0.6 | 0.5 | 0.6 | 1.9 |
| Example 23 | 0.0 | 0.05 | 0.2 | 0.8 |
| Example 24 | 0.0 | 0.0 | 0.07 | 0.6 |

EXAMPLE 26

A composition comprising a mixture of 500 grams of a curable polyepoxide, a blend of bis(2,3-epoxycyclopentyl) ether and epoxidized Novolac, having an epoxy equivalent weight of about 135 and a viscosity of about 5000 centipoises at 25°C. and 500 grams of silicon dioxide (silica) filler was prepared and deairated.

EXAMPLE 27

A composition comprising a mixture of 500 grams of a curable polyepoxide, a blend of bis(2,3-epoxycyclopentyl)-ether and epoxidized Novolac, having an epoxy equivalent weight of about 135 and a viscosity of about 5000 centipoises at 25°C., 0.75 grams of a fifty per cent solution of a cationic polysiloxane quaternary ammonium compound of the formula

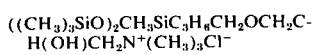

in ethanol, and 500 grams of silicon dioxide (silica) was prepared and deairated.

EXAMPLE 28

A composition comprising a mixture of 500 grams of a curable polyepoxide a blend of bis(2,3-epoxycyclopentyl) ether and epoxidized Novolac having an epoxy equivalent weight of about 135 and a viscosity of about 5,000 centipoises at 25°C., 0.75 grams of a fifty per cent solution of a cationic polysiloxane quaternary ammonium compound of the formula

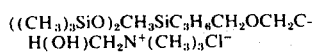

in ethanol, and 500 grams of silicon dioxide (p-quartz) was prepared and deairated.

EXAMPLE 29

The compositions of Examples 26 through 28 were stored at room temperature and periodically measured for filler hard-settling by the method as outlined herein and the results in inches are given in the following table.

TABLE V

| No. | 14 days | 39 days | 60 days | 190 days |
|---|---|---|---|---|
| Example 26 | 0.05 | 0.21 | 0.3 | 0.7 |
| Example 27 | 0.0 | 0.0 | 0.0 | 0.0 |
| Example 28 | 0.0 | 0.0 | 0.0 | 0.0 |

EXAMPLE 30

A polyepoxide free-composition comprising a mixture of 500 grams of a curable polyepoxide amine hardner, N-hydro-ethyl diethylenetriamine, and 500 grams of silicon dioxide (silica) filler was prepared and deairated.

EXAMPLE 31

A polyepoxide free-composition comprising a mixture of 500 grams of a curable polyepoxide amine hardner, N-hydroxyethyl diethylenetriamine, 0.75 grams of a 50 per cent solution of a cationic polysiloxane quaternary ammonium of the formula

in ethanol, and 500 grams of silicon dioxide (silica) filler was prepared and deairated.

Similar polyepoxide-free compositions are prepared and stabilized against filler hard-settling by replacing the above amine hardner with other amine hardners such as diethylenetriamine, triethylenetetramine, tetraethylenepentaamine and the like.

EXAMPLE 32

A polyepoxide-free composition comprising a mixture of a curable polyepoxide amine hardner, tolylenediamine, a liquid aromatic amine, and 500 grams of silicon dioxide (silica) was prepared and deairated.

EXAMPLE 33

A polyepoxide-free composition comprising a mixture of 500 grams curable polyepoxide amine hardner, tolylenediamine, a liquid aromatic amine, 0.75 grams of a fifty per cent solution of a cationic poly-siloxane quaternary ammonium compound of the formula

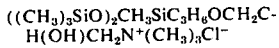

in ethanol, and 500 grams of silicon dioxide (silica) filler was prepared and deairated.

EXAMPLE 34

The compositions of Examples 30 through 33 were stored at room temperature periodically measured for filler hard-settling by the method outlined herein and the results in inches are given in the following table.

TABLE VI

| No. | Aging Time | | |
|---|---|---|---|
| | 6 days | 27 days | 200 days |
| Example 30 | 0.0 | 0.2 | 0.94 |
| Example 31 | 0.0 | 0.0 | 0.0 |
| Example 32 | 0.0 | — | 0.34 |
| Example 33 | 0.0 | — | 0.0 |

EXAMPLE 35

Similar polyepoxide-free compositions are prepared and stabilized against filler hard-settling by following the procedure outlined in Example 31 and replacing the cationic polysiloxane quaternary ammonium compound with 0.75 grams of other cationic quaternary ammonium compounds such as dimethyl dilauryl ammonium chloride, a 50 per cent solution of beta-hydroxyethyltrimethyl ammonium hydroxide in methanol, and the like.

EXAMPLE 36

A composition comprising a mixture of 99.85 per cent by weight of a curable polyepoxide, the diglycidyl ether of 2,2-bis(parahydroxyphenyl) propane having an epoxy equivalent weight of about 190 and a viscosity of about 11,000 centipoises at 25°C., and 0.15 per cent by weight of chlorine base, i.e. a fifty per cent solution of beta-hydroxyethyltriammonium hydroxide in methanol was prepared and deairated. The composition was stored for 30 days at 40°C. at which time the viscosity was found to be about 11,300 cps. at 25°C. indicating virtually no change in the initial viscosity of the polyepoxide.

Various modifications of this invention will be obvious to a worker skilled in the art and it is understood that such modifications and variations are to be included within the purview of this application and the spirit and scope of the appended claims.

What is claimed is:

1. A polyepoxide-free precursor composition for cured polyepoxide products, to which a filler can be incorporated, said composition being resistant to filler hard-settle upon storage and consisting essentially of at least one polyepoxide amine hardner compound having at least two active amino hydrogen atoms which can be on the same or different nitrogen atom, said amine hardner compound having a molecular weight range from about 45 to 10,000 and being selected from the group consisting of alkyl amines, aromatic amines, aralkyl amines, cycloalkyl amines, alkaryl amines, alkylene polyamines, amino-substituted alcohols and phenols, and polyamides; and at least one quaternary ammonium compound in an amount ranging from about 0.02 to less than 0.1 per cent by weight of said ammonium compound based on the weight of amine hardner present said quaternary ammonium compound being selected from the group consisting of dilauryl dimethyl ammonium chloride and betahydroxyethyl trimethylammonium hydroxide.

2. A composition as defined in claim 1, wherein the amine hardner contains from 2 to 50 carbon atoms and is selected from the group consisting of alkyl amines, aromatic amines, and alkylene polyamines; wherein the amount of the quaternary organic ammonium compound ranges from about 0.02 to 0.09 per cent by weight based on the weight of the amine hardner present, and wherein a filler is present as an additional ingredient.

3. A composition as defined in claim 2, wherein the amine hardner is selected from the group consisting of diethylene triamine, triethylene-tetraamine, tetraethylenepentaamine and N-hydroxyethylamine.

4. A composition as defined in claim 2, wherein the amount of the quaternary ammonium compound is about 0.075 per cent by weight based on the weight of the amine hardner present.

5. A composition as defined in claim 3, wherein the ammonium compound is dilauryl dimethyl ammonium chloride.

6. A composition as defined in claim 3, wherein the ammonium compound is beta-hydroethyl trimethylammonium hydroxide.

7. A composition as defined in claim 3, wherein the filler is silicon dioxide and wherein an alcohol solvent for the organic quaternary ammonium compound is also present.

* * * * *